(12) United States Patent
Williams

(10) Patent No.: US 10,235,193 B2
(45) Date of Patent: *Mar. 19, 2019

(54) COLLECTING PERFORMANCE METRICS FROM JAVA VIRTUAL MACHINES

(71) Applicant: International Business Machines Corporation, Armonk, NY (US)

(72) Inventor: Nigel V. Williams, Agoura Hills, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,522

(22) Filed: Nov. 7, 2017

(65) Prior Publication Data
US 2018/0060110 A1   Mar. 1, 2018

Related U.S. Application Data

(63) Continuation of application No. 15/067,625, filed on Mar. 11, 2016, now Pat. No. 9,836,320.

(51) Int. Cl.
*G06F 9/455*   (2018.01)
*G06F 11/34*   (2006.01)

(52) U.S. Cl.
CPC .......... *G06F 9/45504* (2013.01); *G06F 11/34* (2013.01)

(58) Field of Classification Search
None
See application file for complete search history.

(56) References Cited

U.S. PATENT DOCUMENTS 7,557,728 B1 *  7/2009  Bicheno ............... G06F 11/324
                                                           340/328
8,566,800 B2   10/2013  Gagliardi
(Continued)

OTHER PUBLICATIONS

List of IBM Patents or Patent Applications Treated as Related; Date Filed: Nov. 8, 2017, 2 pages.
(Continued)

*Primary Examiner* — Gregory A Kessler
(74) *Attorney, Agent, or Firm* — Cantor Colburn LLP; Teddi Maranzano

(57) ABSTRACT

Embodiments include methods, and computing systems, and computer program products for collecting performance metrics from Java virtual machines. Aspects include: setting up a virtual storage structure of a collector on a computing system for collecting performance metrics data from one or more Java virtual machines, pushing, at each of Java virtual machines through a corresponding performance monitoring Java agent, performance metrics data collected by the Java virtual machine to the virtual storage structure of collector, pulling, at a performance monitoring system through a collector API, the performance metrics data collected by the plurality of Java virtual machines from the virtual storage structure of the collector, analyzing the performance metrics data pulled from the virtual storage structure of the collector by the performance monitoring system, and generating, at the performance monitoring system, a performance alert when the performance metrics data analyzed indicates one or more system abnormalities.

17 Claims, 3 Drawing Sheets

(56) References Cited

U.S. PATENT DOCUMENTS

| | | | |
|---|---|---|---|
| 9,286,089 B2 | 3/2016 | Pirvu | |
| 2010/0299590 A1* | 11/2010 | Gissler | G06F 8/427 |
| | | | 715/239 |
| 2013/0239111 A1* | 9/2013 | Bingham | G06F 9/45533 |
| | | | 718/1 |
| 2014/0089941 A1* | 3/2014 | Ho | G06F 11/3476 |
| | | | 719/318 |
| 2015/0324439 A1 | 11/2015 | Bhave et al. | |
| 2015/0363133 A1* | 12/2015 | Bobroff | G06F 9/45529 |
| | | | 711/170 |

OTHER PUBLICATIONS

Wlliams et al., "Collecting Performance Metrics From Java Virtual Machines"; U.S. Appl. No. 15/067,625, filed Mar. 11, 2016.

\* cited by examiner

COLLECTING PERFORMANCE METRICS FROM JAVA VIRTUAL MACHINES

CROSS-REFERENCE TO RELATED APPLICATION

This application is a continuation of U.S. application Ser. No. 15/067,625, filed Mar. 11, 2016, the contents of which are hereby incorporated by reference in its entirety.

BACKGROUND

The present disclosure relates generally to mainframe computing, and more particularly to methods and systems of collecting performance metrics data from Java virtual machines.

A Java virtual machine (JVM) interprets compiled Java binary code (called bytecode) for a computer's processor (or "hardware platform") so that it can perform a Java program's instructions. Java was designed to allow application programs to be built that could be run on any platform without having to be rewritten or recompiled by the programmer for each separate platform. More and more applications are running on JVMs, and monitoring JVM performance becomes important to ensure the applications are running smoothly and efficiently, and to manage and maintain system health. To maintain system health, performance events are constantly monitored to detect application progress and liveness. To manage system health, performance tuning is performed to detect performance issues, drill down to find causes of these performance issues, and identify solutions.

Computers need to share resources, such as memory, CPU, and disks where data is stored. Certain processes to retrieve performance metrics data can cause the computer to slow down, to perform sub-optimally for various types of computers. For example, most computers rely on a network connection to collect performance metrics data, and when network bottlenecks occur, the entire performance metrics data collection operation slows down, or stops when the network is down.

Therefore, heretofore unaddressed needs still exist in the art to address the aforementioned deficiencies and inadequacies.

SUMMARY

In an embodiment of the present invention, a method for collecting performance metrics data from Java virtual machines may include: setting up a virtual storage structure of a collector on a computing system for collecting performance metrics data from one or more Java virtual machines, pushing, at each of Java virtual machines through a corresponding performance monitoring Java agent, performance metrics data collected by the Java virtual machine to the virtual storage structure of collector, pulling, at a performance monitoring system through a collector API, the performance metrics data collected by the plurality of Java virtual machines from the virtual storage structure of the collector, analyzing the performance metrics data pulled from the virtual storage structure of the collector by the performance monitoring system, and generating, at the performance monitoring system, a performance alert when the performance metrics data analyzed indicates one or more system abnormalities.

In another embodiment of the present invention, a computing system for collecting performance metrics data from Java virtual machines may include a memory storing computer executable instructions for the computing system, and a processor for executing the computer executable instructions. When the computer executable instructions are executed at the processor, the computer executable instructions cause the computing system to perform: setting up a virtual storage structure of a collector on a computing system for collecting performance metrics data from one or more Java virtual machines, pushing, at each of Java virtual machines through a corresponding performance monitoring Java agent, performance metrics data collected by the Java virtual machine to the virtual storage structure of collector, pulling, at a performance monitoring system through a collector API, the performance metrics data collected by the plurality of Java virtual machines from the virtual storage structure of the collector, analyzing the performance metrics data pulled from the virtual storage structure of the collector by the performance monitoring system, and generating, at the performance monitoring system, a performance alert when the performance metrics data analyzed indicates one or more system abnormalities.

In yet another embodiment of the present invention, a non-transitory computer readable storage medium may store computer executable instructions. When the computer executable instructions are executed by a processor of a computing system, the computer executable instructions cause the computing system to perform: setting up a virtual storage structure of a collector on a computing system for collecting performance metrics data from one or more Java virtual machines, pushing, at each of Java virtual machines through a corresponding performance monitoring Java agent, performance metrics data collected by the Java virtual machine to the virtual storage structure of collector, pulling, at a performance monitoring system through a collector API, the performance metrics data collected by the plurality of Java virtual machines from the virtual storage structure of the collector, analyzing the performance metrics data pulled from the virtual storage structure of the collector by the performance monitoring system, and generating, at the performance monitoring system, a performance alert when the performance metrics data analyzed indicates one or more system abnormalities.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
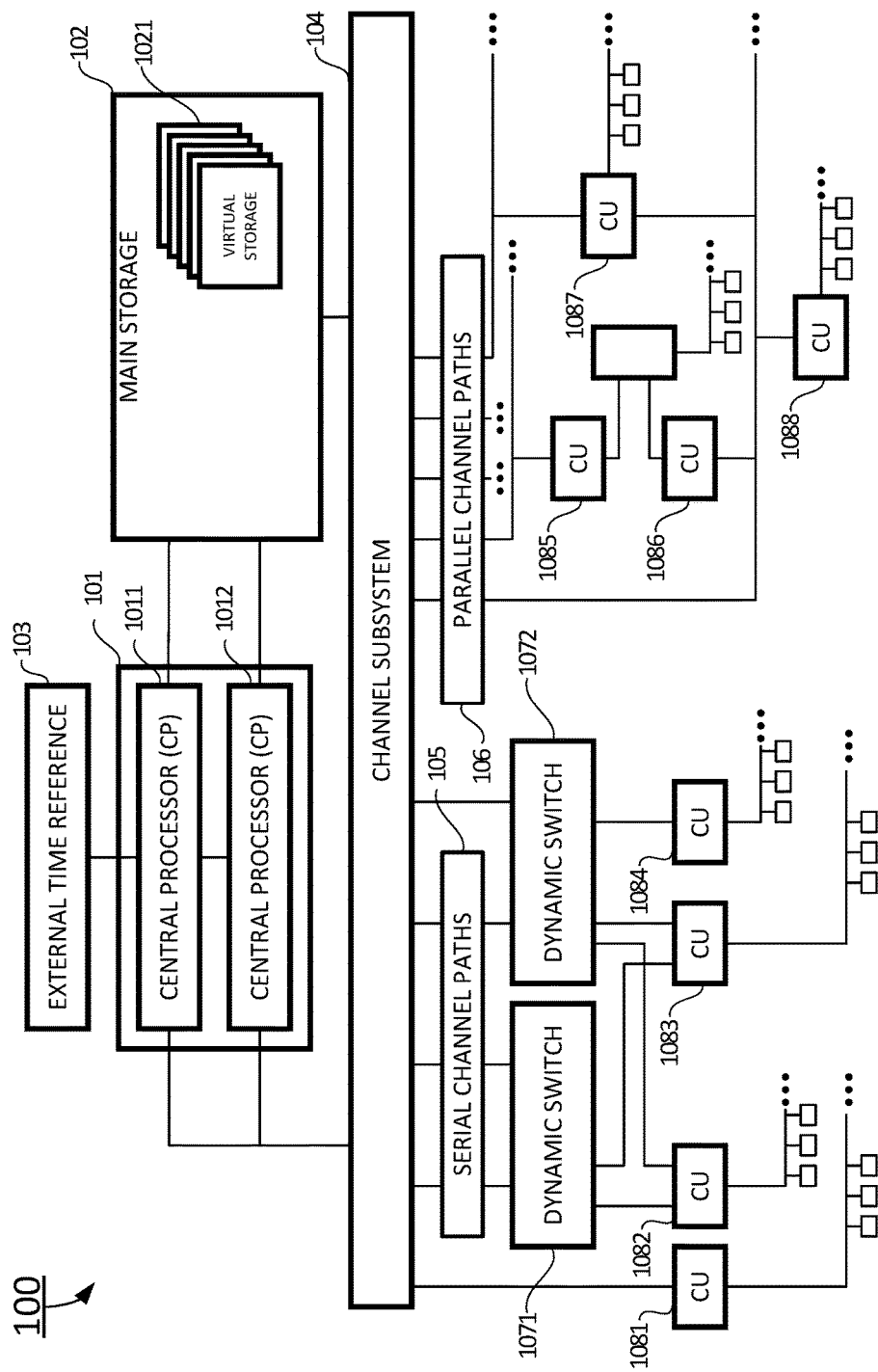
FIG. 1 is a block diagram of a mainframe computer for implementing the teachings herein according to certain embodiments of the present invention.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

"Java" is a general-purpose computer programming language that is concurrent, class-based, object-oriented, and specifically designed to have as few implementation dependencies as possible. Java is a trademark of Oracle Corporation.

"JVM" stands for Java virtual machine.

"LPAR" stands for logic partition.

"ITM" stands for IBM Tivoli Monitoring.

"TEMA" stands for Tivoli Enterprise Monitoring Agent.

"OMEGAMON" is a software family of performance monitors for IBM zEnterprise computer environments. OMEGAMON is a trademark of IBM Corporation.

"GVT" stands for Global Vector Table.

As used herein, "plurality" means two or more. The terms "comprising," "including," "carrying," "having," "containing," "involving," and the like are to be understood to be open-ended, i.e., to mean including but not limited to.

The present disclosure will now be described more fully hereinafter with reference to the accompanying drawings FIGS. 1-3, in which certain exemplary embodiments of the present disclosure are shown. The present disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Referring to FIG. 1, a block diagram of a mainframe computer 100 that implements the teachings herein is shown according to certain embodiments of the present invention. The mainframe computer 100 may include a central processor (CP) 101, a main storage 102, an external time reference 103, a channel subsystem 104, a serial channel path 105, and a parallel channel path 106. In one embodiment, the mainframe computer 100 may include one or more application processors, such as 1011 and 1012, as shown in FIG. 1. Each of the CP 1011 and CP 1012 may be a single core processor, or a multi-core processor and they are the main processing power of the mainframe computer 100.

In certain embodiments, the main storage 102 may include non-volatile read only memory (ROM), and volatile random access memory (RAM). The non-volatile read-only memory may be used to store computer programs, operating systems and persistent data. The volatile RAM may be used to load and execute computer executable instructions, and store live data such as performance metrics data. In one embodiment, the main storage 102 may include a virtual storage 1021 for storing performance metrics data collected from various Java virtual machines. The virtual storage 1021 may include volatile memory for storing live performance metrics data used for real-time monitoring Java virtual machine performance, and non-volatile memory for storing historical performance metrics data used for historical performance analysis and performance tuning. In certain embodiments, the virtual storage 1021 may be a common collector, or a collector. The collector is a data space in system memory cache to collect data. The collector is a process on the mainframe computer 100, only one collector is needed for each logic partition (LPAR). The collector will hold performance metrics data in regular virtual storage for all of the JVMs it monitors.

The external time reference (ETR) 103 may be connected to the mainframe computer 100 to guarantee time synchronization among distinct computer systems. One or more ETR cards provide interfaces to system timers, which are used for timing synchronization among computer systems.

The channel subsystem 104 is physically, exactly the same as a central processor (CP), but with a different microcode. The channel subsystem 104 acts as an offload engine for the CPs. Different server models have different number of channel subsystems. The channel subsystems relieves CP involvement, thus guaranteeing one available channel path to execute the input/output (I/O) operation, but it is not in charge of the movement between the central storage (CS) and the channel.

A channel assists in dialogs with an I/O control unit (CU), to execute an I/O operation, i.e., data transfer from or to memory and devices. With multiprogramming and multiprocessing becoming more and more popular, using channel to assist CP for I/O operation makes CP and I/O operations more efficient. A channel path employs either a parallel-transmission electric protocol or a serial-transmission light protocol, and accordingly, is called either a parallel channel path (106) or a serial channel path (105). For better connectivity and flexibility, a serial channel may connect to a control unit (CU, 1081, 1082, 1083, and 1084 as shown in FIG. 1) through one or more dynamic switches (1071 and 1072, as shown in FIG. 1). The dynamic switches 1071 and 1072 are capable of providing multiple connections between entities connected to ports of the dynamic switches, or between the channels and I/O control units (CUs).

Figure 2:
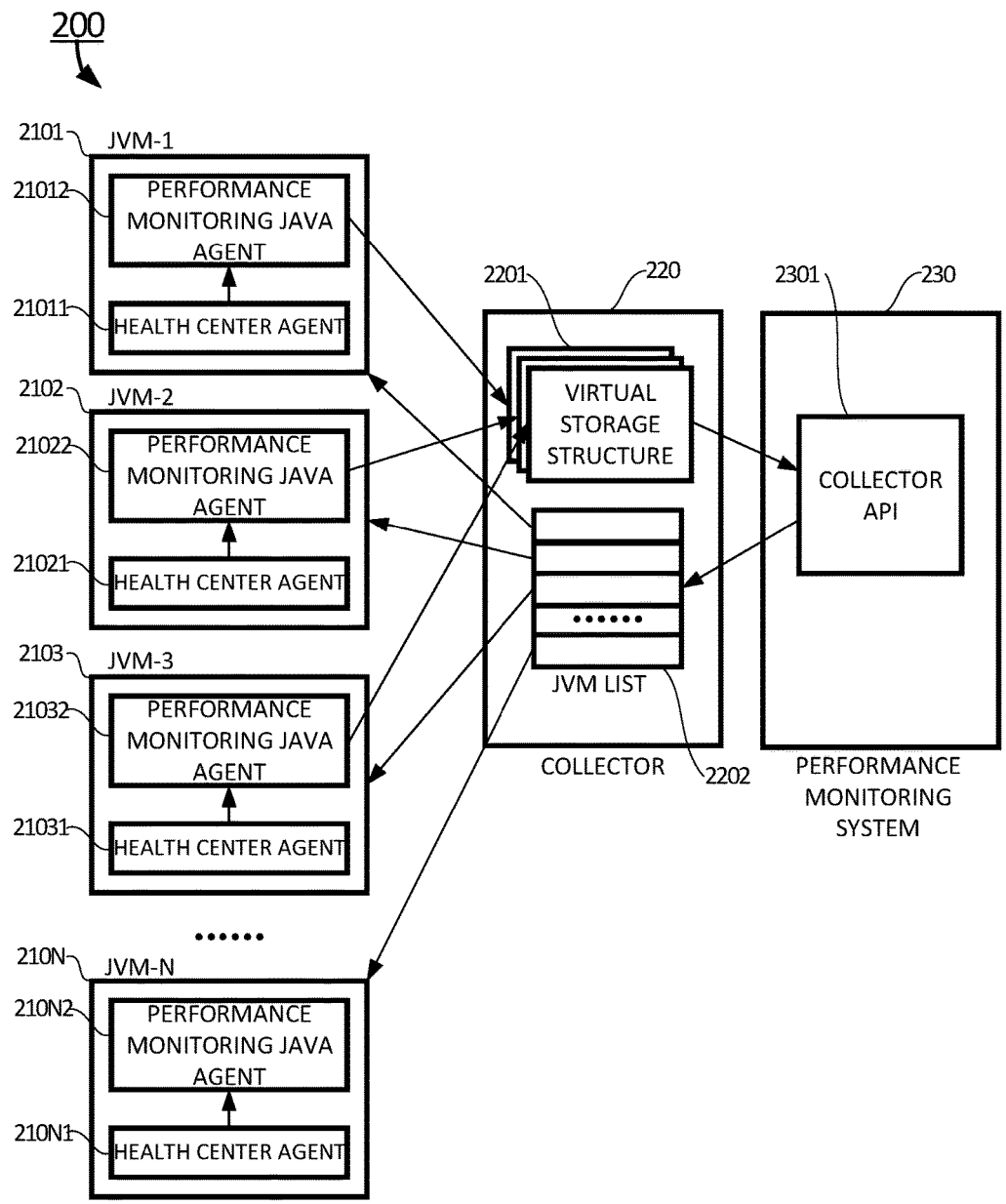
FIG. 2 is a block diagram of a computing system to collect performance metrics data from Java virtual machines according to certain embodiments of the present invention.

Referring now to FIG. 2, a block diagram of a system 200 for collecting performance metrics data from Java virtual machines is shown according to certain embodiments of the present invention. In certain embodiments, the system 200 may include one or more Java virtual machines 2101, 2102 . . . and 210N, where N is a positive integer, a collector 220, and a performance monitoring system 230. The Java virtual machines 2101, 2102 . . . and 210N may have health center agents 21011, 21021 . . . and 210N1 installed, respectively. The health center agents 21011, 21021 . . . and 210N1 may include performance monitoring Java agents 21012, 21022 . . . and 210N2. In certain embodiments, the performance monitoring Java agents 21012, 21022 . . . and 210N2 may include OMEGAMON Java agents. OMEGAMON is a software family of performance monitors for IBM mainframe computer environments, and each of the performance monitoring Java agents monitors the system health of each individual Java virtual machine, respectively. In certain embodiments, the performance monitoring system 230 may include Tivoli Enterprise Monitoring Agent (TEMA).

Tivoli OMEGAMON Performance Management Suite for z/OS is available as part of IBM Service Management Suite for z/OS. IBM Service Management Suite for z/OS includes IBM Service Management Unite—a service management dashboard that brings mainframe management information and tasks from disparate sources into a single environment. In certain embodiments, performance metrics data for Java virtual machines are collected by the performance monitoring Java agents of the health center agents of each of the Java virtual machines. These performance monitoring Java agents collect performance metrics data such as garbage collection performance, threads and locking details, system response time, system throughput, CPU utilization, memory and storage utilization, and details within the JVM environment including system and environment variables that could be affecting performance.

One of the novel aspects of the present disclosure is to use non-conventional performance data collection method instead of conventional network approach. The performance monitoring Java agent accomplishes the performance metrics data collection by using a health center agent, an application program interface (API) built in all IBM JVMs, and by using this API from within the JVM and transferring the collected performance metrics data to an IBM Tivoli Monitoring (ITM) management framework using low-level cross-memory services. Such a cross-memory service has low overhead, is minimal invasive, and is independent from other system services like network service. Even when the network service is down, the performance monitoring will not be disrupted.

In certain embodiments, the collector 220 may include a virtual storage structure 2201, and a Java virtual machine (JVM) list 2202. The virtual storage structure 2201 may be a portion of the virtual storage 1021 of the mainframe computer 100 that stores live performance metrics data collected by each of the performance monitoring Java agents. In one embodiment, the virtual storage structure 2201 may include volatile memory such as RAM.

When the performance monitoring system 230 and collector 220 are started, a stacking, non-space switching program call (PC) routine is built in common storage. The PC number and an address of a global vector table (GVT) of the collector 220 are written to z/OS name token services using an LPAR-unique identifier (ID) associated with the collector 220. When the performance monitoring Java agents are ready to push performance metrics data to the virtual storage structure 2201 of the collector 220, these performance monitoring Java agents invoke a C++ Java Native Interface (JNI) call which calls an assembler subroutine to call z/OS name token services and retrieves the token string for the collector 220. Name token service call is a facility in the operating system which allows common access to all the address spaces. If a name of a service is known, the name token service will return a token, which contains the address space id, the PC number, the address of collector to send the performance metrics data.

A collector ID (CollID) is used to identify where the collector 220 is. Only one collector 220 is needed for each logic partition (LPAR). The PC number is retrieved from the token, and called. The PC routine is granted access to a collector access list and enters cross-memory access register (AR). An Access List Entry Table (ALET) of the collector 220 is loaded into the access register for transferring performance monitoring data packets from the performance monitoring Java agent to the virtual storage structure 2201 of the collector 220. These performance monitoring data packets are appended to the virtual storage structure 2201 using a non-blocking algorithm implemented with the compare-double-and-swap instruction.

In certain embodiments, the JVM list 2202 is a list the collector 220 receives data from each of the JVMs. Each JVM is running in a z/OS process, a task or a job, identified by its job name and address space id, and unique identifier: process ID, which is a Unix structure, uniquely identifies each individual JVM. Java is used to transform the performance metrics data into XML, transfer the performance metrics data in XML to the collector 220, where the performance metrics data is parsed, then transformed back to C++ object for the performance monitoring system 230.

In certain embodiments, the performance monitoring system 230 may include a collector application program interface (API) 2301. The collector API 2301 may be a part of an Enterprise Common Collector. The Enterprise Common Collector is installed on a supported platform (Windows/UNIX/Linux) either within a monitored ensemble or outside of an ensemble (one or more JVMs monitored) when the Enterprise Common Collector is not be impacted by outages of the one or more JVMs monitored. The Enterprise Common Collector connects to one or more zEnterprise Hardware Management Consoles (zHMC) to monitor multiple ensembles across the zHMCs. The Enterprise Common Collector uses the collector API 2301 to retrieve performance metrics data from each of the one or more JVMs. The common collector provides a Representational State Transfer (ReST) API for connecting clients to use for Enterprise Common Collector administration and data retrieval functions.

In certain embodiments, the collector 220 acts as an intermediate performance metrics data storage. Each of the performance monitoring Java agents pushes performance metrics data to the collector 220, and the collect API 2301 of the performance monitoring system 230 pulls performance metrics data from the collector 220.

Figure 3:
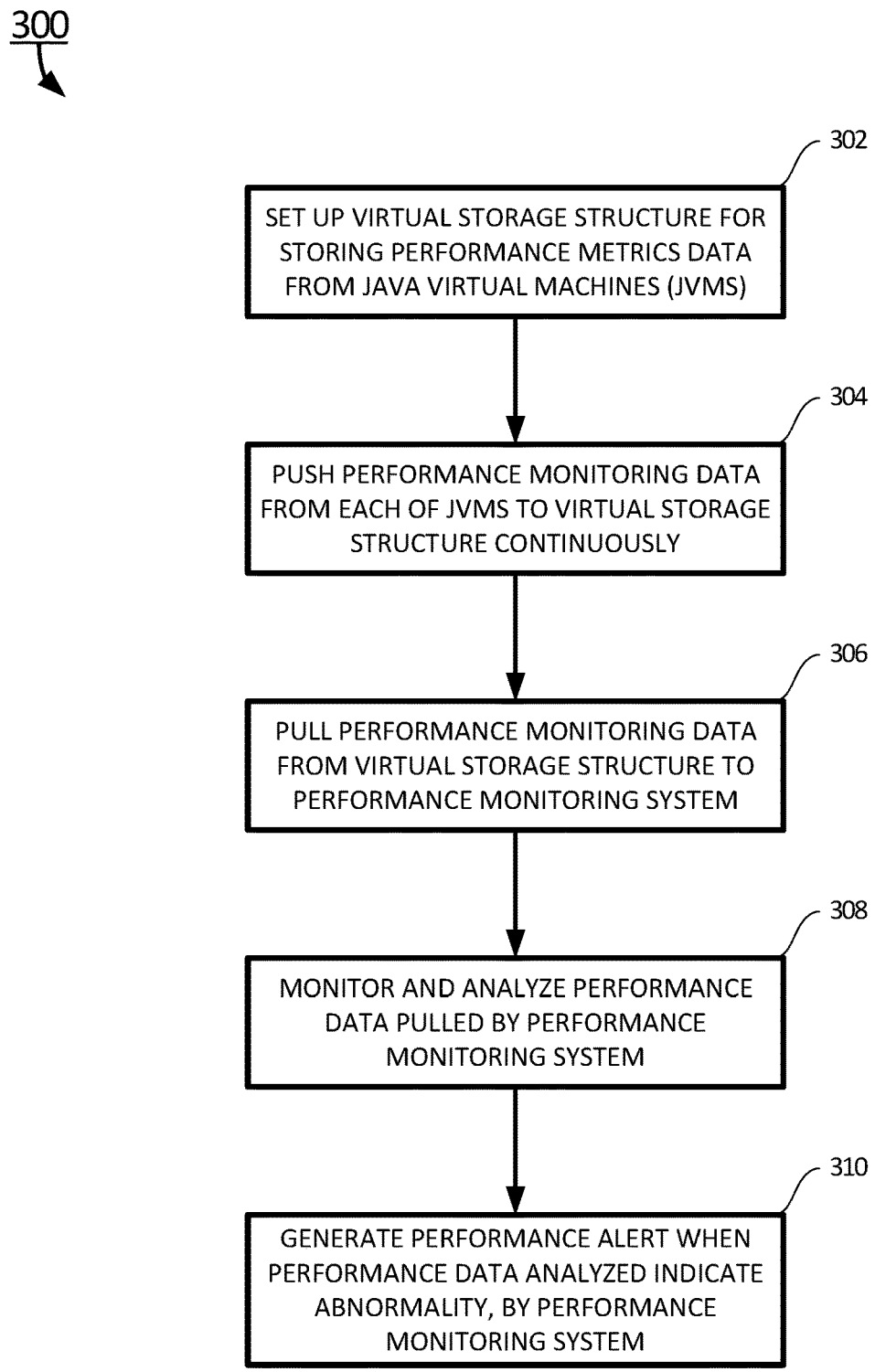
FIG. 3 is a flow chart of a method of collecting performance metrics data from Java virtual machines according to certain embodiments of the present invention.

Referring now to FIG. 3, a flow chart of a method 300 for collecting performance metrics data from Java virtual machines according to certain embodiments of the present invention.

At block 302, a virtual storage structure 2201 and a JVM list 2202 are set up on the collector 220 for storing performance metrics data collected from each of Java virtual machines the performance monitoring system 230 is monitoring.

In certain embodiments, setting up the virtual storage structure 2201 may include: setting up a global vector table (GVT) and structures for storing performance metrics data collected from each of the Java virtual machines, setting up a program call (PC) routine, and setting up a system-wide addressable name-token with a unique name having a collector identifier (ID), and a token having a PC number, a GVT address and an address space token (STOKEN).

When the performance monitoring system 230 and collector 220 are started, a stacking, non-space switching program call (PC) routine is built in common storage. The PC number and the address of the collector global vector table (GVT) are written to z/OS name token services using an LPAR-unique ID associated with the collector 220. When the performance monitoring Java agents are ready to push performance metrics data to the ITM framework, these performance monitoring Java agents invoke a C++ Java Native Interface (JNI) call which calls an assembler subroutine to call z/OS Name Token services and retrieves the token string for the collector.

The JVM list 2202 is a list the collector 220 receives data from each of the JVMs. Each JVM is running in a z/OS process, a task or a job, identified by its job name and address space id, and unique identifier: process ID, which is a Unix structure, uniquely identifies each individual JVM. Java is used to transform the performance metrics data into XML, transfer the performance metrics data in XML to the collector 220, where the performance metrics data is parsed, and then transformed back to C++ object for the performance monitoring system 230.

At block 304, once the virtual storage structure 2201 and the JVM list 2202 are established, each of the performance monitoring Java agents 21012, 21022 . . . and 210N2 of the JVMs 2101, 2102 . . . and 210N pushes collected performance metrics data to the virtual storage structure 2201 through a low-level cross-memory service. Such a using low-level cross-memory service does not require network between the JVMs 2101, 2102 . . . and 210N and the collector. Each of the JVMs pushes the performance metrics data packets to a portion of the virtual storage structure 2201 as specified by the Access List Entry Table (ALET) of the collector 220. These packets are appended to the virtual storage structure 2201 using a non-blocking algorithm implemented with the compare-double-and-swap instruction. Such a performance metrics data push is performed continuously.

At block 306, at the performance monitoring system 230, the collector API 2301 pulls the performance metrics data storage in the virtual storage structure 2201 to the performance monitoring system 230.

In one embodiment, the collector API 2301 pulls the performance metrics data storage in the virtual storage structure 2201 to the performance monitoring system 230 for a historical collection. The performance metrics data pulled through the historical collection is usually collected periodically in a predetermined interval, such as every minute, every five minutes, and so on. The performance metrics data pulled through the historical collection is usually stored in a non-volatile portion of the virtual storage 1021 for performance analysis in a later time. Such a performance analysis is helpful for future planning, and system performance tuning.

In another embodiment, the collector API 2301 pulls the performance metrics data stored in the virtual storage structure 2201 to performance monitoring system 230 for a situation collection. The performance metrics data pulled through the situation collection is usually collected periodically in a predetermined interval, such as every minute, every five minutes, and so on. The performance metrics data pulled through the situation collection is usually stored in a volatile portion of the virtual storage 1021 for live performance analysis in real-time. The virtual storage structure 2201 may storage the performance metrics data pulled through the situation collection for a sliding window of a predetermined time period, for example, last 30 minutes, or last 60 minutes (last hour), etc.

In yet another embodiment, the collector API 2301 pulls the performance metrics data storage in the virtual storage structure 2201 to performance monitoring system 230 for an interactive collection. The performance metrics data pulled through the interactive collection is usually collected as an operator decided to examine a specific JVM. The operator operates a zEnterprise Hardware Management Consoles (zHMC) to monitor the specific JVM. The Enterprise Common Collector uses the collector API 2301 to retrieve performance metrics data from the virtual storage structure 2201 through the JVM list 2202 using its job name, address space id, and process ID.

At block 308, performance metrics data through the historical collection, the situation collection and the interactive collection is analyzed by a situation analyzer.

In one embodiment, the performance metrics data collected through historical collection is retrieved from the virtual storage structure 2201 and a performance analysis is performed. Such a performance analysis is helpful for future planning, and system performance tuning.

In another embodiment, current state of the JVMs is examined using a situation analyzer using the performance metrics data pulled through the situation collection, to see any of the metrics exceeds a predetermined threshold. For example, when garbage collection occurs at a high rate, heap occupancy is more than 80%, response time has exceeded a predetermined threshold, system throughput becomes increasing low, or CPU usage exceeds a predetermined threshold, a situation may be triggered.

In yet another embodiment, current state of the specific JVM is examined using a situation analyzer using the performance metrics data pulled through the interactive collection, to see any of the metrics exceeds a predetermined threshold. For example, when garbage collection occurs at a high rate, heap occupancy is more than 80%, response time has exceeded a predetermined threshold, system throughput becomes increasing low, or CPU usage exceeds a predetermined threshold, a situation may be triggered.

At block 310, a performance report or a performance alert may be generated when the performance metrics data analyzed indicates abnormality.

In one embodiment, for the historical collection, a performance report may be generated to assess the performance of the Java virtual machines. Such a performance analysis is helpful for future planning, and system performance tuning.

In another embodiment, for the situation collection, when a situation is triggered, an alert may be sent to the performance monitoring system 230 or an event console an operator is monitoring, respective subject matter experts may be notified, and a problem ticket may be opened. Such alerts are generated automatically, without someone actually looking for it, or searching through the performance metrics data stored in the virtual storage structure 2201.

In yet another embodiment, for the interactive collection, when a situation is triggered, an alert may be displayed to the performance monitoring system or an event console for the operator, respective subject matter experts may be notified, and a problem ticket may be opened. Such alerts are generated as on-demand by the operator.

In another embodiment of the present invention, a computing system for collecting performance metrics data from Java virtual machines may include a memory storing computer executable instructions for the computing system, and a processor for executing the computer executable instructions. When the computer executable instructions are executed at the processor, the computer executable instructions cause the computing system to perform: setting up a virtual storage structure of a collector on a computing system for collecting performance metrics data from one or more Java virtual machines, pushing, at each of Java virtual machines through a corresponding performance monitoring Java agent, performance metrics data collected by the Java virtual machine to the virtual storage structure of collector, pulling, at a performance monitoring system through a collector API, the performance metrics data collected by the plurality of Java virtual machines from the virtual storage structure of the collector, analyzing the performance metrics data pulled from the virtual storage structure of the collector by the performance monitoring system, and generating, at the performance monitoring system, a performance alert when the performance metrics data analyzed indicates one or more system abnormalities.

In yet another embodiment of the present invention, a non-transitory computer readable storage medium may store computer executable instructions. When the computer executable instructions are executed by a processor of a computing system, the computer executable instructions cause the computing system to perform: setting up a virtual storage structure of a collector on a computing system for collecting performance metrics data from one or more Java virtual machines, pushing, at each of Java virtual machines through a corresponding performance monitoring Java agent, performance metrics data collected by the Java virtual machine to the virtual storage structure of collector, pulling, at a performance monitoring system through a collector API, the performance metrics data collected by the plurality of Java virtual machines from the virtual storage structure of the collector, analyzing the performance metrics data pulled from the virtual storage structure of the collector by the performance monitoring system, and generating, at the performance monitoring system, a performance alert when the performance metrics data analyzed indicates one or more system abnormalities.

The present invention may be a computing system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of collecting performance metrics data from Java virtual machines, comprising:
   setting up a virtual storage structure of a collector on a computing system for collecting performance metrics data from a plurality of Java virtual machines, wherein setting up a virtual storage structure comprises setting up a global vector table (GVT) and structures for storing performance metrics data collected from each of the plurality of Java virtual machines, a program call (PC) routine, and a system-wide addressable name-token with a unique name comprising a collector identifier (ID), and a token having a PC number, a GVT address and an address space token (STOKEN);
   pushing, at each of the plurality of Java virtual machines through a corresponding performance monitoring Java agent, performance metrics data collected by the Java virtual machine to the virtual storage structure of the collector;
   pulling, at a performance monitoring system through a collector application programming interface (API), the performance metrics data collected by the plurality of Java virtual machines from the virtual storage structure of the collector;
   transforming performance metrics into extensible markup language (XML);
   transforming XML performance metrics into a C++ object;
   analyzing the performance metrics in the C++ object pulled from the virtual storage structure of the collector by the performance monitoring system; and
   generating, by the performance monitoring system, a performance alert when the performance metrics data analyzed indicates one or more system abnormalities.

2. The method of claim 1, wherein pushing performance metrics data comprises:
   pushing the performance metrics data collected by the Java virtual machine to the virtual storage structure of the collector through a low-level cross-memory service.

3. The method of claim 1, wherein pushing performance metrics data comprises:
   pushing the performance metrics data collected by the Java virtual machine to the virtual storage structure of the collector continuously.

4. The method of claim 1, wherein pulling performance metrics data comprises:
   pulling the performance metrics data collected by the plurality of Java virtual machines from the virtual storage structure of the collector periodically in a predetermined interval.

5. The method of claim 1, wherein pulling performance metrics data comprises:
   a historical collection;
   a situation collection; and
   an interactive collection.

6. The method of claim 1, wherein the performance metrics data comprises:
   garbage collection performance;
   threads and locking details;
   system response time;
   system throughput;
   central processing unit (CPU) utilization;
   memory utilization; and
   Java virtual machine environment details.

7. A computing system comprising a memory storing computer-executable instructions for the computing system, and a processor for executing the computer-executable instructions, the computer-executable instructions comprising:
   setting up a virtual storage structure of a collector on the computing system for collecting performance metrics data from a plurality of Java virtual machines, wherein setting up a virtual storage structure comprises setting up a global vector table (GVT) and structures for storing performance metrics data collected from each of the plurality of Java virtual machines, a program call (PC) routine, and a system-wide addressable name-token with a unique name comprising a collector identifier (ID), and a token having a PC number, a GVT address and an address space token (STOKEN);
   pushing, at each of the plurality of Java virtual machines through a corresponding performance monitoring Java agent, performance metrics data collected by the Java virtual machine to the virtual storage structure of the collector;

pulling, at a performance monitoring system through a collector API, the performance metrics data collected by the plurality of Java virtual machines from the virtual storage structure of the collector;

transforming performance metrics into extensible markup language (XML);

transforming XML performance metrics into a C++ object;

analyzing the performance metrics in the C++ object pulled from the virtual storage structure of the collector by the performance monitoring system; and generating, by the performance monitoring system, a performance alert when the performance metrics data analyzed indicates one or more system abnormalities.

8. The computing system of claim 7, wherein pushing performance metrics data comprises:

pushing the performance metrics data collected by the Java virtual machine to the virtual storage structure of the collector through a low-level cross-memory service.

9. The computing system of claim 7, wherein pushing performance metrics data comprises:

pushing the performance metrics data collected by the Java virtual machine to the virtual storage structure of the collector continuously.

10. The computing system of claim 7, wherein pulling performance metrics data comprises:

pulling the performance metrics data collected by the plurality of Java virtual machines from the virtual storage structure of the collector periodically in a predetermined interval.

11. The computing system of claim 7, wherein pulling performance metrics data comprises:

a historical collection;
a situation collection; and
an interactive collection.

12. The computing system of claim 7, wherein the performance metrics data comprises:

garbage collection performance;
threads and locking details;
system response time;
system throughput;
CPU utilization;
memory utilization; and
Java virtual machine environment details.

13. A computer program product for collecting performance metrics data from Java virtual machines, comprising a computer-readable storage medium having computer-executable instructions embodied therewith, when executed by a processor on the computing system, the computer-executable instructions cause the processor to perform:

setting up a virtual storage structure of a collector on the computing system for collecting performance metrics data from a plurality of Java virtual machines, wherein setting up a virtual storage structure comprises setting up a global vector table (GVT) and structures for storing performance metrics data collected from each of the plurality of Java virtual machines, a program call (PC) routine, and a system-wide addressable name-token with a unique name comprising a collector identifier (ID), and a token having a PC number, a GVT address and an address space token (STOKEN);

pushing, at each of the plurality of Java virtual machines through a corresponding performance monitoring Java agent, performance metrics data collected by the Java virtual machine to the virtual storage structure of the collector;

pulling, at a performance monitoring system through a collector API, the performance metrics data collected by the plurality of Java virtual machines from the virtual storage structure of the collector;

transforming performance metrics into extensible markup language (XML);

transforming XML performance metrics into a C++ object;

analyzing the performance metrics in the C++ object pulled from the virtual storage structure of the collector by the performance monitoring system; and generating, by the performance monitoring system, a performance alert when the performance metrics data analyzed indicates one or more system abnormalities.

14. The computer program product of claim 13, wherein pushing performance metrics data comprises:

pushing the performance metrics data collected by the Java virtual machine to the virtual storage structure of the collector through a low-level cross-memory service; and pushing the performance metrics data collected by the Java virtual machine to the virtual storage structure of the collector continuously.

15. The computer program product of claim 13, wherein pulling performance metrics data comprises:

pulling the performance metrics data collected by the plurality of Java virtual machines from the virtual storage structure of the collector periodically in a predetermined interval.

16. The computer program product of claim 13, wherein pulling performance metrics data comprises:

a historical collection;
a situation collection; and
an interactive collection.

17. The computer program product of claim 13, wherein the performance metrics data comprises:

garbage collection performance;
threads and locking details;
system response time;
system throughput;
CPU utilization;
memory utilization; and
Java virtual machine environment details.

* * * * *